(12) United States Patent
Grigor et al.

(10) Patent No.: US 6,473,101 B1
(45) Date of Patent: Oct. 29, 2002

(54) SINGLE SURFACE MULTI-VIEW PANNING SYSTEM AND METHOD FOR MULTIPLE DISPLAYS

(76) Inventors: Gordon F. Grigor, 135B Cranbrooke Avenue, Toronto, Ontario (CA), M5M 1M6; Hugo Chung, 88 Corporate Drive, #802, Scarborough, Ontario (CA), M1H 3G6; Barry G. Wilks, 118 Mercer Crescent, Markham, Ontario (CA), L3P 4K4

( * ) Notice: Subject to any disclaimer, the term of this patent is extended or adjusted under 35 U.S.C. 154(b) by 0 days.

(21) Appl. No.: 09/240,812

(22) Filed: Feb. 1, 1999

(51) Int. Cl.[7] .................................................. G06F 3/00
(52) U.S. Cl. ........................ 345/784; 345/781; 345/804
(58) Field of Search ................................. 345/121, 123, 345/124, 125, 339, 340, 341, 1, 2, 332, 331, 502, 505, 522, 523, 525, 509, 781, 784, 804

(56) References Cited

U.S. PATENT DOCUMENTS 5,014,222 A * 5/1991 Donahue .................... 364/521
5,345,551 A * 9/1994 Shelley et al. ............... 345/346
5,555,002 A * 9/1996 Nguyen ....................... 345/121
5,745,096 A * 4/1998 Ludolph et al. ............. 345/120
6,037,936 A * 3/2000 Ellenby et al. .............. 345/339

* cited by examiner

Primary Examiner—John Cabeca
Assistant Examiner—Kieu D. Vu

(57) ABSTRACT

A multi-view panning system and method links a plurality of virtual desktops into one larger desktop that may be navigated through the use of a position indicator over multiple display devices. The system and method facilitates multiple view panning by a user. In one embodiment, a separate panning rectangle is defined for each display device and a separate viewing area is associated with each panning rectangle. A common multi-display surface is defined to bound all pan locking rectangles associated with each display device of interest. Movement of a position indicator across at least one boundary of one pan locking rectangle causes the position indicator to control which data is contained in the second rectangular view on the second display to facilitate multi-view panning in a common surface, such as a desktop surface, over multiple displays.

20 Claims, 8 Drawing Sheets

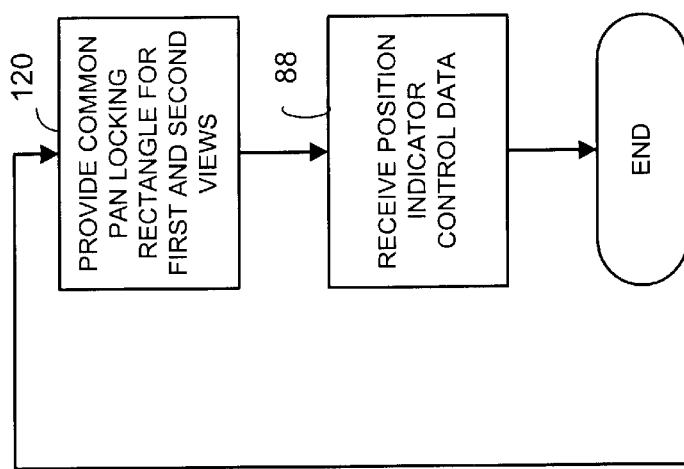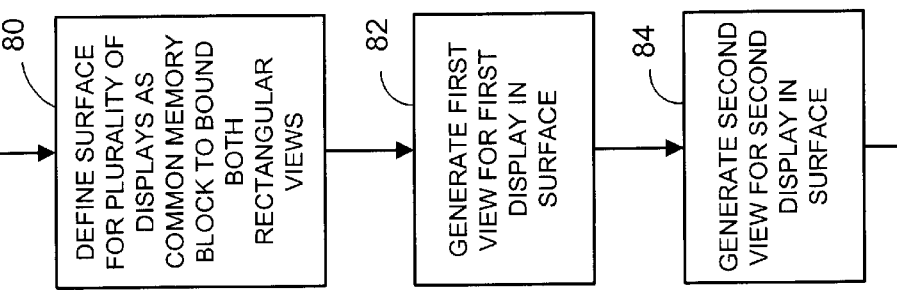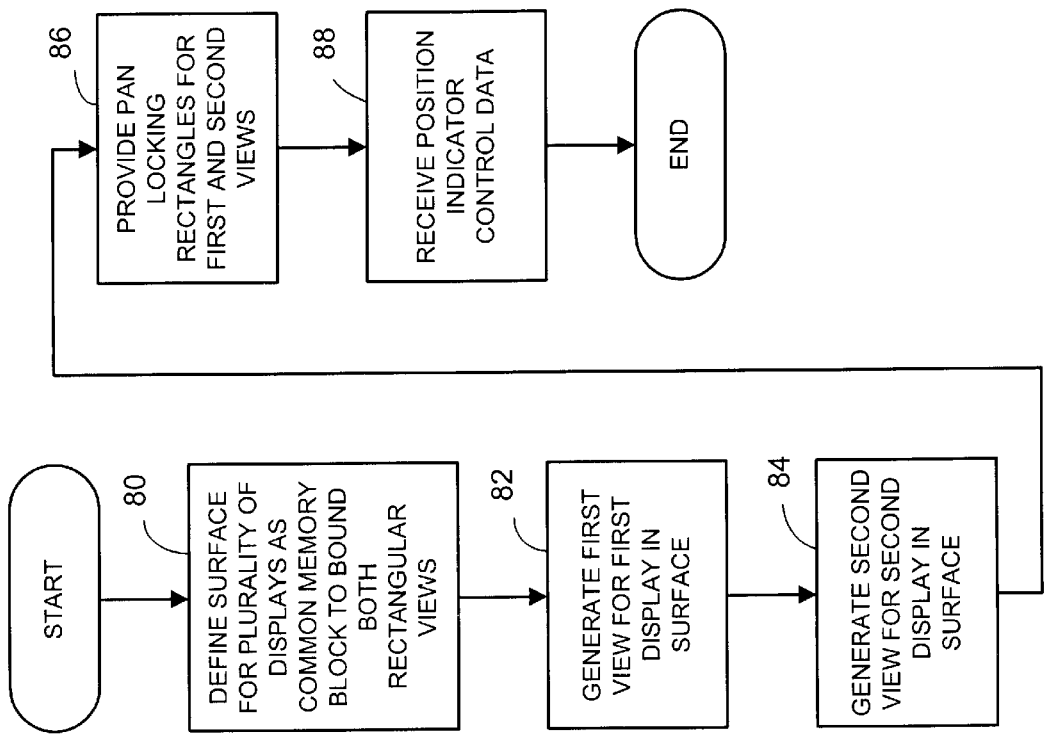

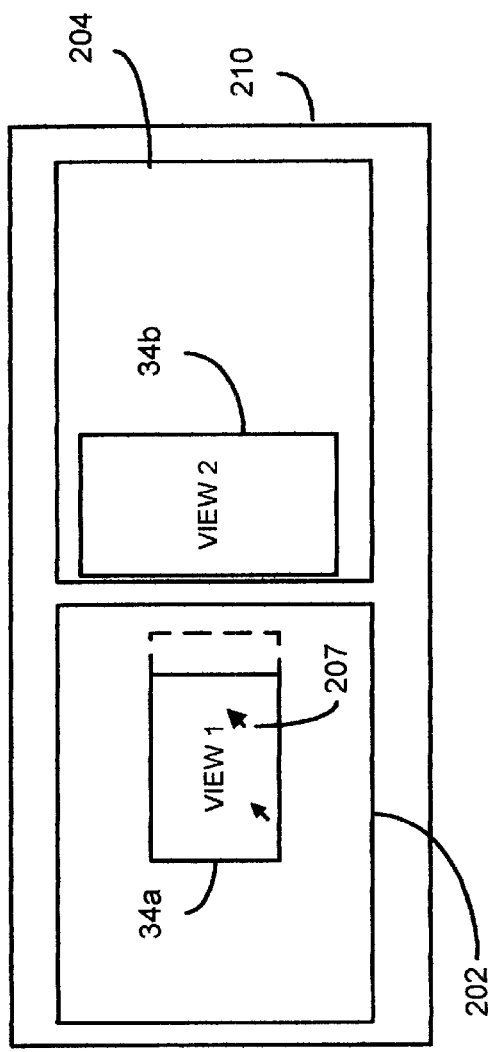
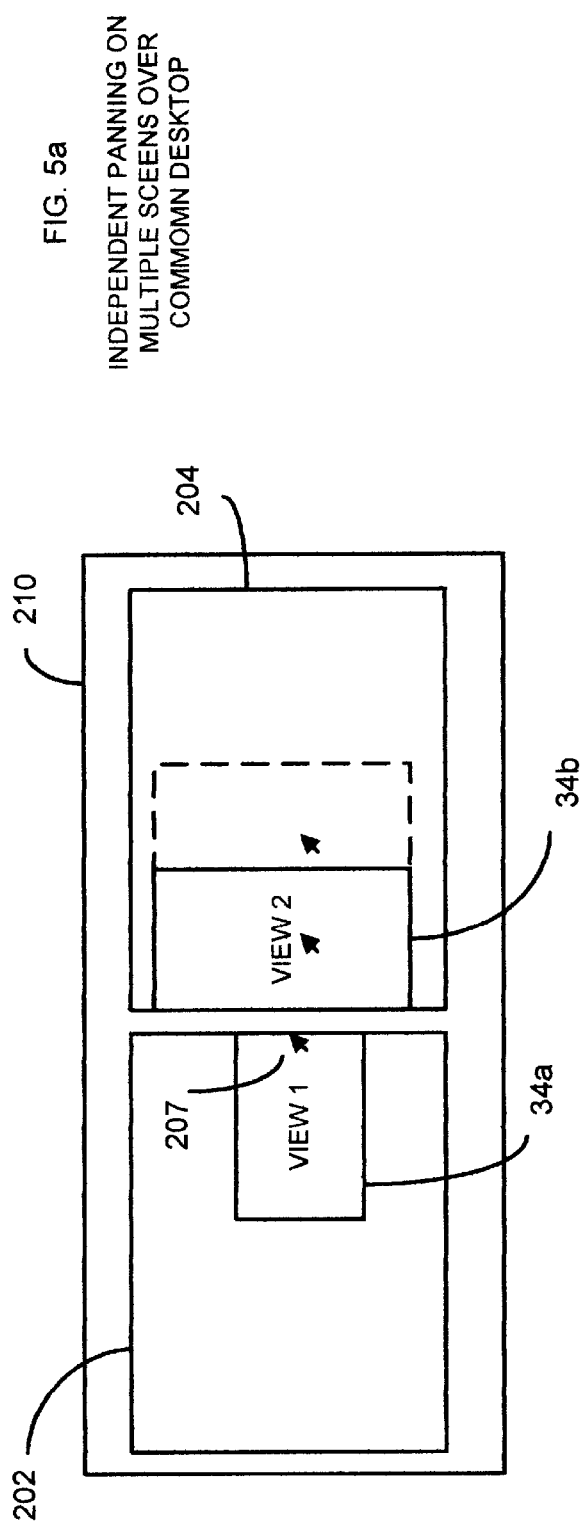
FIG. 5a
INDEPENDENT PANNING ON MULTIPLE SCEENS OVER COMMOMN DESKTOP

LINKED MULTIVIEW PANNING

SINGLE SURFACE MULTI-VIEW PANNING SYSTEM AND METHOD FOR MULTIPLE DISPLAYS

FIELD OF THE INVENTION

The invention relates generally to systems and methods for displaying data in windows on display devices and more particularly to systems and methods that facilitate view panning for multiple display devices.

BACKGROUND OF THE INVENTION

Virtual desktops are known which allow a computer user or other display device user to view additional surface space on a virtual desktop. For example, a user may move a position indicator, such as a cursor, across a viewing area on a screen and as the cursor moves the data displayed on the screen changes to give the appearance that the user is moving across the top of the desk. The desktop (i.e., the surface) is larger than the viewing area presented on the display device. In conventional graphics controller chips and other display device control systems, a user may define a surface mode by indicating how a surface is configured such as the height, width, color depth and refresh rate to configure surface dimensions.

Graphics controller chips or graphics adapter chips are known which output display data to multiple displays such as an LCD display or a CRT monitor. Such graphics adapters or graphics controller chips have to accommodate the timing differences of the various displays such as differing refresh rates and resolutions. Conventional graphics controller chips use separate memory controllers to configure both displays and to display different data on both displays such as movies on one display and text on another display or both movies and text on the same display.

The virtual desktop arrangement allows the user to see other documents other than the one the user may be using by panning across the desktop. Conventional graphics controller chips for example, define a view area which is often selectable in size by a user. With dual or multiple displays, a separate desktop or surface is defined for each display device. Independent data is shown on two distinct desktops. For example, display devices typically display two different surfaces on the two different displays and hence there is a discontinuous surface being shown and displayed on each display device. To draw an image for example, multiple controllers must identify and compute image data for two memory surfaces, one surface being associated with each display device. This can unnecessarily limit the available working surface.

Other systems are known that utilize one desktop surface and breakup the surface into separate pieces on multiple displays to display one piece on one display and another piece on another display. However, such systems typically only show one-half of each surface on each display. The combinations of the two displays equals the entire desktop surface. Such systems do not also typically offer the capability of panning to see the entire surface from both displays. Also, conventional display systems typically limit a user's ability to view an entire surface when the surface is larger than the display areas on multiple display screens. Moreover, conventional systems typically do not allow a user to pan continuously across multiple viewing areas to allow multiple screens to be used as a single larger screen or an even larger desktop surface over which to navigate.

Consequently a need exists for an improved display system that can afford increased flexibility in utilizing surfaces, such as virtual desktops, when using multiple display devices. It would be desirable if such a system used a single graphics adapter to generate a multiple view panning system for multiple display devices.

BRIEF DESCRIPTION OF THE DRAWINGS

FIG. 1b is a block diagram illustrating in more detail the processing unit shown in FIG. 1a.

FIG. 2a is a flowchart illustrating one example of the operation of the system shown in FIG. 1a.

FIG. 3b is a block diagram illustrating in more detail the processing unit shown in FIG. 3a.

FIG. 4 is a flowchart illustrating the operation of the system shown in FIG. 3a.

FIGS. 5a and 5b are graphic illustrations of alternate embodiments of a multi-view panning system in accordance with varying embodiments of the invention.

DETAILED DESCRIPTION OF A PREFERRED EMBODIMENT OF THE INVENTION

Briefly, a multi-view panning system and method links a plurality of virtual desktops into one larger desktop that may be navigated through the use of a position indicator over multiple display devices. The system and method facilitates independent multi-view view panning from a common surface by a user. In one embodiment, a separate panning rectangle is defined for each display device and a separate viewing area is associated with each panning rectangle. A common multi-display surface is defined to bound (i.e., contain) all pan locking rectangles associated with each display device of interest. Movement of a position indicator across at least one boundary of one pan locking rectangle causes the position indicator to control which data is contained in the second rectangular view on the second display to facilitate multi-view panning in a common surface, such as a desktop surface, over multiple displays.

In another embodiment, a system and method links views on multiple display devices and uses a common pan locking rectangle to bound the multiple rectangular views of the multiple display devices. The common pan locking rectangle, bounded by the common multi-display surface, facilitates rectangular pan locking that bounds the first and second rectangular views. This facilitates generation of a large virtual desktop over multiple displays from a single graphics adapter or processing unit. A processing unit links boundaries of the first and second rectangular views so that the rectangular views appear to move together when a position indicator reaches the linked boundary.

Figure 1A:
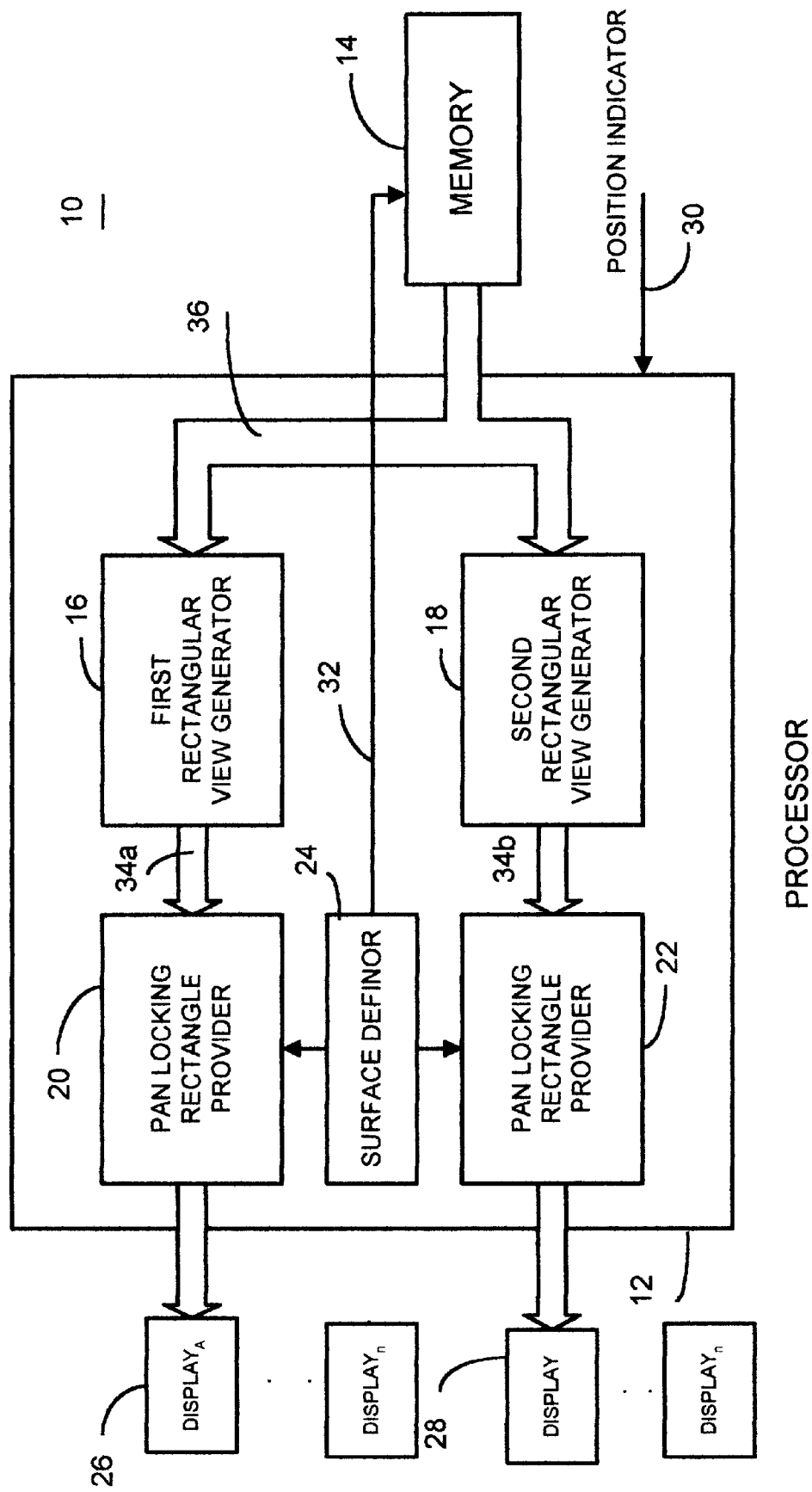
FIG. 1a is a block diagram illustrating one embodiment of an apparatus for displaying information through a common processing unit on a plurality of display devices in accordance with one embodiment of the invention.

FIG. 1a shows a multi-view panning apparatus 10 having a processor 12 and memory 14. The memory 14 contains data to be displayed in at least the first and second rectangular views on at least first and second display devices. For example the multiple display devices may be an LCD display, a flat panel display, a CRT monitor, or any other suitable display device.

The processor 12 includes a first rectangular view generator 16, a second rectangular view generator 18, a first pan locking rectangle provider 20, a second pan locking rectangle provider 22 and a surface definer 24. The processor 12 is operatively coupled to first and second display units 26 and 28. Position indication data 30 is a received from a position indicator, such as a mouse, voice recognition system or any other suitable display reference indication mechanism. The first rectangular view generator 16 defines a first rectangular view for the first display device 26. The first rectangular view is, for example, a rectangle having a position and size for displaying data within a pre-defined surface, such as a larger virtual desktop surface. The surface is defined, for example, by a user through a graphical user interface (gui) through the surface definer 24. The surface definer 24 provides surface definition data which is used by the processing unit to define at least one surface as a block of memory containing display data wherein the surface bounds the first and second rectangular views on the first and second displays. As such, the surface definer 24 may generate surface definition data 32 to set aside a block of memory.

Similarly, the second rectangular view generator 18 defines a second rectangular view for the second display device. The second rectangular view is a rectangle for example having a position and size within the surface defined by the surface definer 24.

The first and second pan locking rectangle providers 20 and 22 are-each respectively associated with the first rectangular view resultant from the first rectangular view generator, and the second rectangular view obtained from the second rectangular view generator. The first rectangular view and second rectangular view are indicated as 34a and 34b. The first rectangular view generator 16 and second rectangular view generator 18 obtain display data 36 from memory which then defines the display rectangles 34a and 34b. The pan locking rectangle providers 20 and 22 provide pan locking rectangles that are independent. A separate pan locking rectangle is defined for the first rectangular view 34a while the second pan locking rectangle provider 22 defines a second pan locking rectangle for the second rectangular view 34b. The rectangular views 34a and 34b are then output to the display devices and bounded by the pan locking rectangles. As known in the art, the pan locking rectangles are used to allow a user to pan within a pre-defined space, namely within the pan locking rectangle.

The multi-view panning system 10 receives position data, such as X, Y, coordinate data from the position indicator so that the movement of a position indicator across at least one boundary of the first pan locking rectangle (or second pan locking rectangle) causes the position indicator to control which data is contained in the second rectangular view (or first pan locking rectangle) on the second display to facilitate multi-view panning in a common surface over multiple displays.

The processor 12 may be any suitable number of memory controllers or processing devices. The processor may be used in any suitable application. The processor, by way of example, may be located on a common graphics adapter card or multiple graphics cards. However, it will be recognized that any suitable combination of processing devices may also be used if desired. Each of the components of the processor 12 may be software modules, logic circuitry including state machines, or any suitable combination thereof if desired.

Figure 1B:
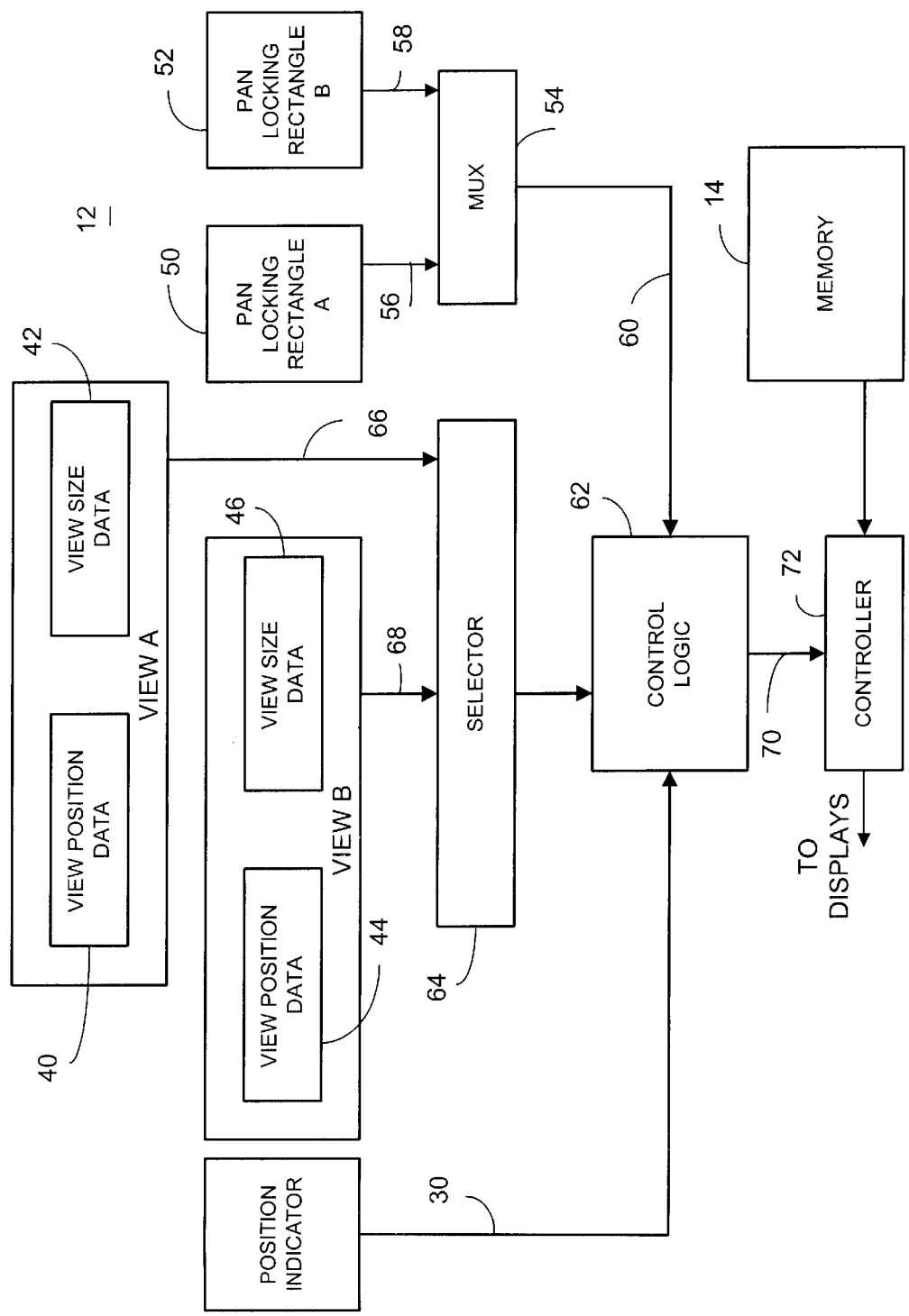

FIG. 1b shows the processor 12 having a first view data provider from, for example, the first rectangular view generator that provides rectangular view position data 40 and rectangular view size data 42. Similarly for the second rectangular view, there is associated view position data 44 and view size data 46. The pan locking rectangle associated with the first rectangular view is shown as pan locking rectangle 50. Similarly, there is also pan locking rectangle 52 generated by the pan locking rectangle provider 22. The multiplexer 54 receives the pan locking rectangle data 56, such as pan locking rectangle size and position data based on pan locking rectangle 50 and pan locking rectangle data 58 based on the pan locking rectangle 52 and selects, under control of the processing unit, which panning rectangle the position indicator is in and provides the selected pan locking data 60 to control logic 62.

A multi-view selector 64 selects which of the multiple views are to be updated as a consequence of panning by a user. As such, the multi-view selector 64 receives the view position data 40 and size data 42 (indicated as data 68) and the view position and size data 44 and 46 (indicated as data 66) corresponding to each of their respective rectangular views. The control logic 62 outputs control data 70 to a memory controller 72 based on a comparison of the position indicator within a given rectangular view and pan locking rectangle. The requisite display data is then obtained by the controller 72 from memory 14 and output the appropriate display device.

Figure 2B:
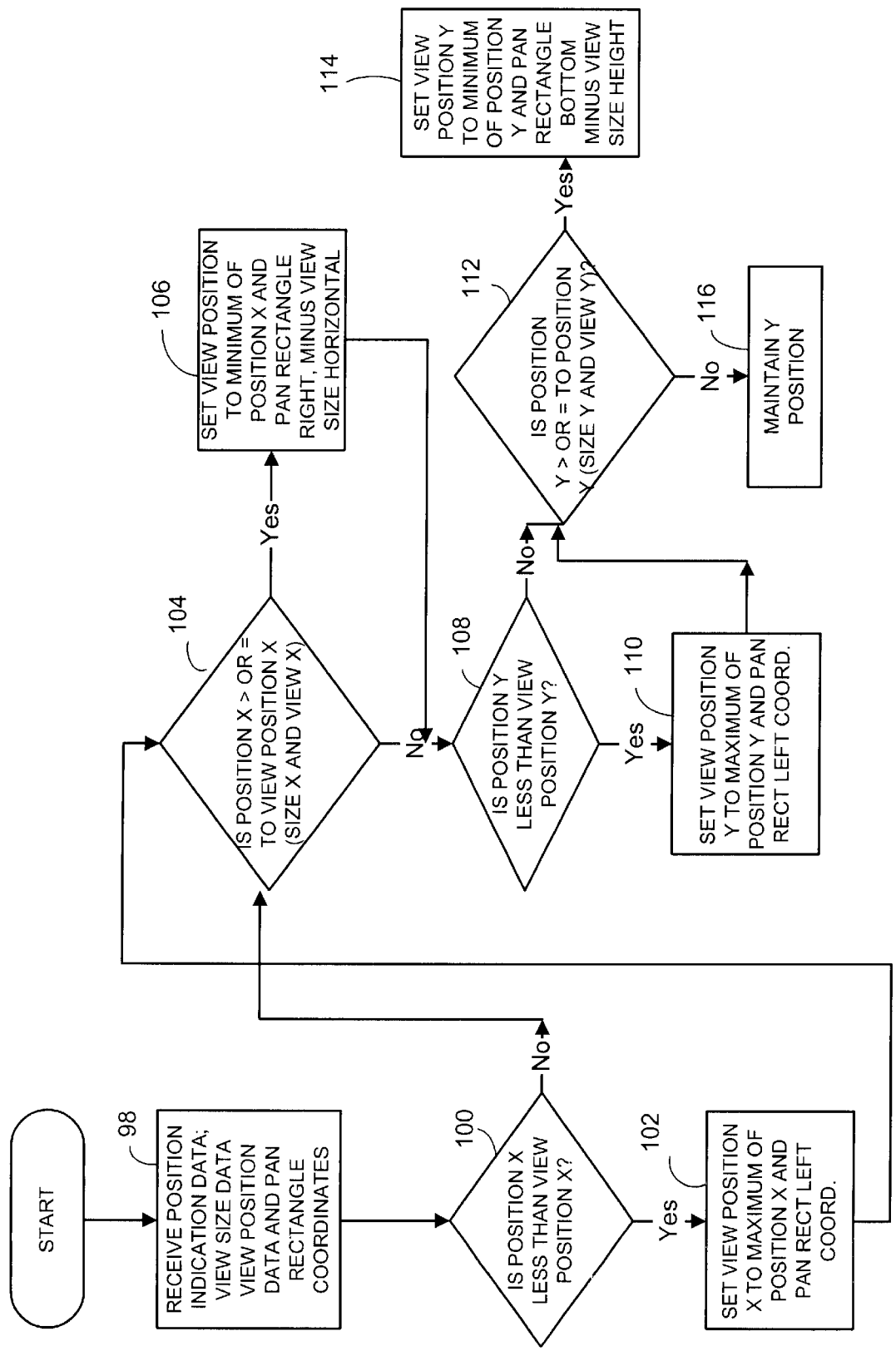
FIG. 2b is a flowchart illustrating the operation of the logic circuit shown in FIG. 1b.

Referring to FIGS. 2a and 2b, in operation, as shown in block 80, the processing unit defines the surface for the plurality of displays as a common block of memory which bounds all rectangular views of interest. The block of memory contains display data to be displayed on the multiple displays. As shown in block 82, the system generates at least a first rectangular view (or non-rectangular view if desired) for the first display as a rectangle having a position and size for displaying data within the surface. The display data for the first rectangular view includes data from a defined memory space containing data to be displayed in the first rectangular view.

As shown in block 84 the system generates a second rectangular view for the second display device as a rectangle having a position and size for displaying data within the surface. The second rectangular view contains data from memory space having data defined for display as the second rectangular view. As shown in block 86, the system provides a pan locking rectangle associated with the first rectangular view and another independent pan locking rectangle associated with the second rectangular view. The independent pan locking rectangles however are bounded by the defined surface. As shown in block 88, the system receives position indicator control data such that movement of a position indicator across at least one boundary of one of the pan locking rectangles causes the position indicator to control which data is contained in the second or other rectangular view on the other display. This facilitates multiple view panning in a common surface over multiple displays.

In a preferred embodiment, although not necessary, the data portrayed in each of the first rectangular and second rectangular views is not equal to one-half of the data required to portray one-half of the entire surface. As such, each rectangular view contains either more or less than one-half of the data required to portray one-half of the entire surface.

Also, the system allows the generation of a definable rectangular view area for each of the first and second displays such that the first and second rectangle view areas may be, for example, user selectable through a graphic user interface. For example, the user may be prompted by a graphical user interface to select the height, width and position of a rectangular view area for each display device.

Referring to FIG. 2b, the control logic of FIG. 1b receives the view size data, view position data, the pan locking position and size data, as well as position indicator data. This is shown in block 98. As shown in block 100, if the X coordinate position indicated by the position indicator is less than the X coordinate view position associated with a given view, indicating that the user moved a cursor to the left of a boundary of a current rectangular view, the system sets the X coordinate view position to a maximum of either the X coordinate position or the pan locking rectangle left side coordinate. This is shown in block 102. If however, the current X coordinate position of the cursor is not less than the X coordinate for the view position, the system determines whether the X coordinate position is greater than or equal to the view position X coordinate plus the view size width, as shown in block 104. As shown in block 106, if the X coordinate position is greater than or equal to the view position X coordinate plus the view size width, the system sets the viewing position X coordinate of the view to the minimum of the position indicator X coordinate position and the pan locking rectangle right side location, minus the horizontal view size (view size width). In other words, if the position indicator is moved beyond the outside of the view, the view is moved to contain the position indicator unless the view is restricted by the pan locking rectangle.

As shown in block 108, the logic determines if the Y coordinate of the cursor position is less than the view position Y coordinate. As shown in block 110, if the Y coordinate position of the position indicator is less than the view position Y coordinate, the logic sets the view position Y coordinate to the maximum of the Y coordinate position of the position indicator and the pan rectangle left coordinate. As shown in block 112, the logic then determines if the Y coordinate of the position indicator is greater than or equal to the view position Y location plus the view size height. If the Y coordinate of the position indicator is greater than or equal to the view position Y location plus the view size height, the system sets the view position Y location to the minimum of the position Y and the panning rectangle bottom side minus the view size height as shown in block 114. The logic then waits for the new position indication data as indicated by block 116. The above process is then repeated for each view and corresponding pan locking rectangle.

Figure 3A:
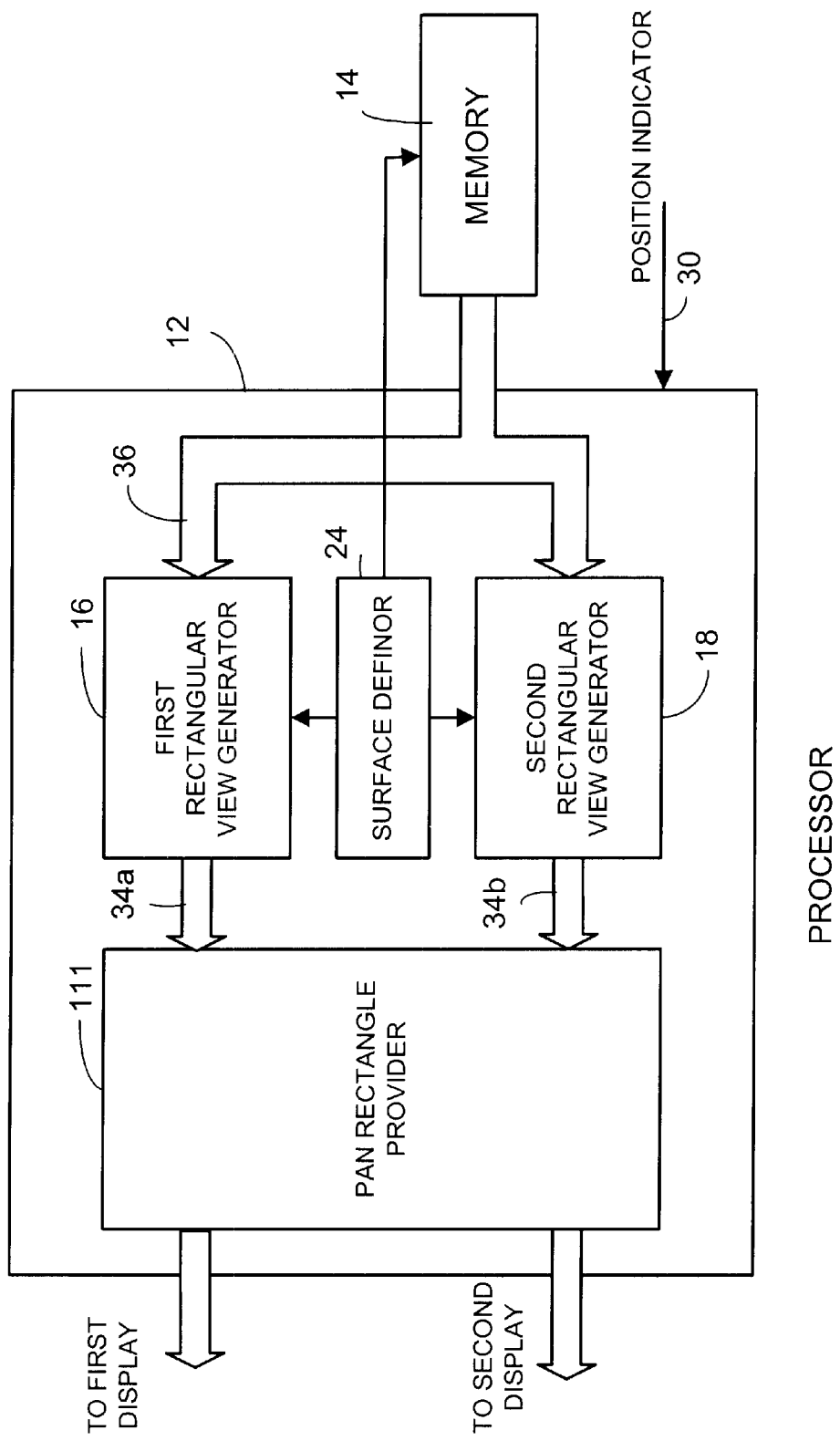
FIG. 3a is an alternate embodiment of an apparatus for displaying information on a plurality of display devices in accordance with one embodiment of the invention.

FIG. 3a shows an alternative embodiment of a multi-view panning system that includes a pan linking mechanism to link rectangular views on multiple displays to give the appearance that the rectangular views move together within a single pan locking rectangle over multiple displays. Linking may operate such that the two views are linked with space between the views or linked to share a view boundary (see for example, FIG. 5b). The processor 12, in this embodiment, includes a pan locking rectangle provider 111 operatively coupled to receive and facilitate rectangular pan locking to bound both the first and second rectangular views. The data to be displayed on the first and second display devices is changed by the processing unit in response to receiving pan control data, such as cursor position data, to facilitate the generation of a large virtual desktop over multiple displays from a single processing unit or a graphics adapter.

Figure 3B:
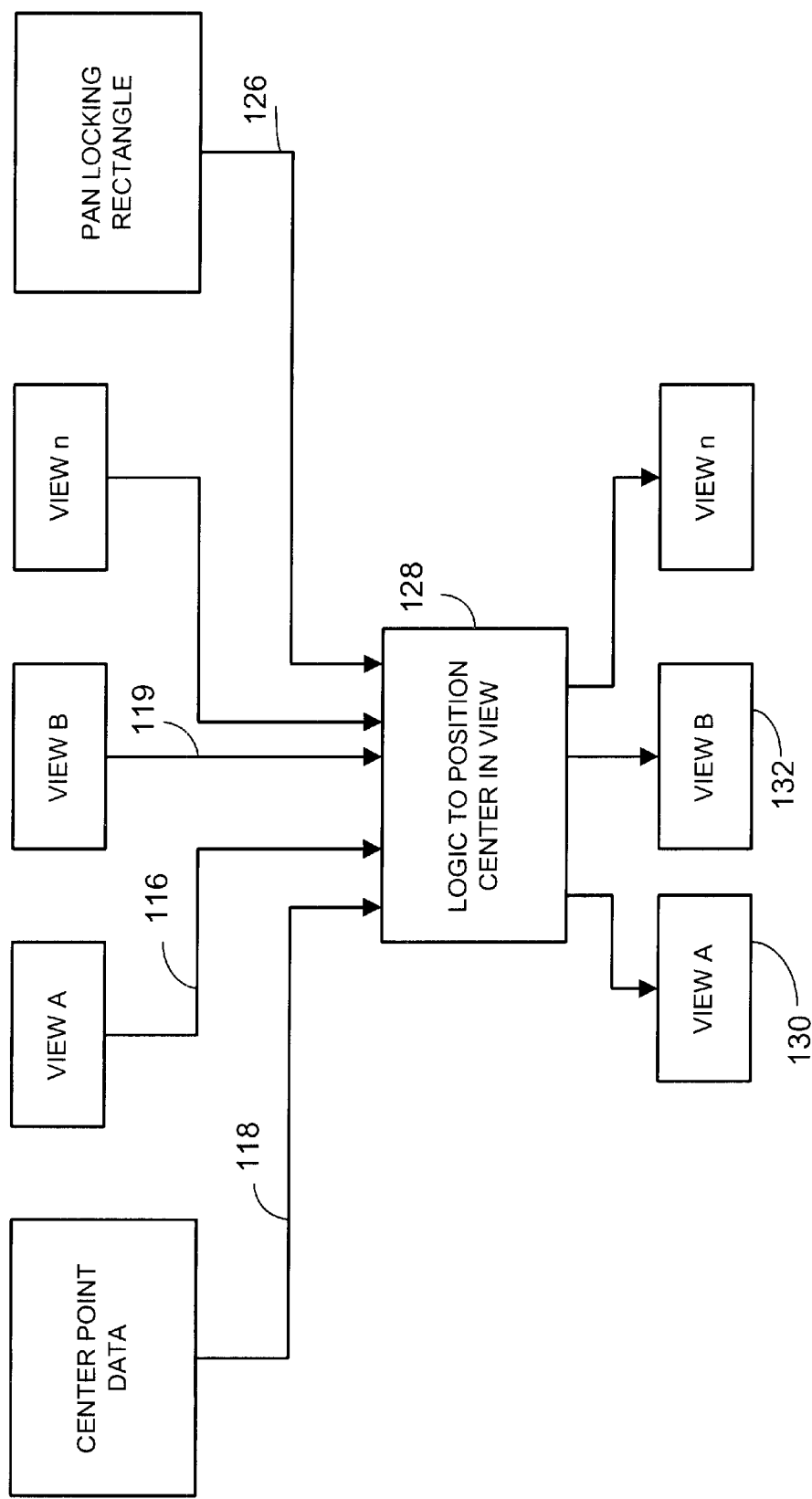

Referring to FIG. 3b, the processor receives the single pan locking rectangle data that bounds all views from the pan locking rectangle provider, such as the pan locking rectangle coordinates 126 into a logic block 128 which serves to position the position indicator in the center of a view as the position indicator is moved. Center point data 118 is generated by the processing unit for the logic block, which is also preferably part of the processing unit. As known for pan locking, center point data is determined based on the relative position indicator data to the view areas.

The processing unit (logic block 128) links the boundaries of the first and second rectangular views based on the view size and position data 116 and 119 so that the rectangular views appear to move together when a position indicator reaches a linked boundary. The processing unit links adjacent boundaries of a first and second rectangular views by generating views 130 and 132 on the respective displays to contain data that makes the appearance that the rectangular views for two different display devices are linked together to form a combined larger view area.

For example, referring to FIG. 5a, to generate a linked multi-view over a plurality of display devices, the logic block 128 aligns the views such that the view 2 position X is set equal to view 1 position X plus view 1 size width and view 2 position Y is set equal to view 1 position Y plus delta Y. Alternatively, where the views are located above and below one another, the logic block 128 assigns view 2 position Y equal to the view 1 position Y plus the size height of view 1. In addition, view 2 position X is set equal to view 1 position X plus a delta X.

To keep the views within the panning rectangle, the system determines the maximum X distance that the combined views occupy. For example, the system sets MAX X to be equal to the highest of the view 1 position X plus the view 1 size width, or the view 2 position X plus the view 2 size width. The MIN X is set to be the lower of the view 1 position X or the view 2 position X. The MAX Y and MIN Y are similarly determined.

The data on the display devices is changes to give the appearance that the views are inside the single pan locking rectangle. One example of this operation is as follows:

- if the position indicator X coordinate position is less than the MIN X value, the view 1 position X is set equal to the maximum of either the position indicator X coordinate position and the pan locking rectangle left side, minus the MIN X;
- if the position indicator X is greater than the MAX X value, the view position X coordinate is set equal to the minimum of either the position indicator X value and the pan locking rectangle right side, minus the MAX X;
- if the position indicator Y coordinate is less than the MINY value, the system sets the view 1 position Y equal to the maximum of either the position indicator Y and the pan locking rectangle tope side, minus the MIN Y value; and
- if the position indicator Y coordinate Y is greater than or equal to the MAX Y, the view 1 position Y is set equal to the minimum of the position indicator Y and the pan locking rectangle bottom sine minus the MAX Y. Also, in an alternate embodiment, the system need not link boundaries, but may instead link views based on a fixed relative distance between the two views.

As shown in FIG. 4, the operation with the system shown in 3a is similar to that of previously described. However, a difference is that this embodiment provides a common pan locking rectangle for first and second views as shown in block 120. This is different from the single and independent pan locking rectangles generated for each rectangular view in the previous embodiment.

Figure 5B:
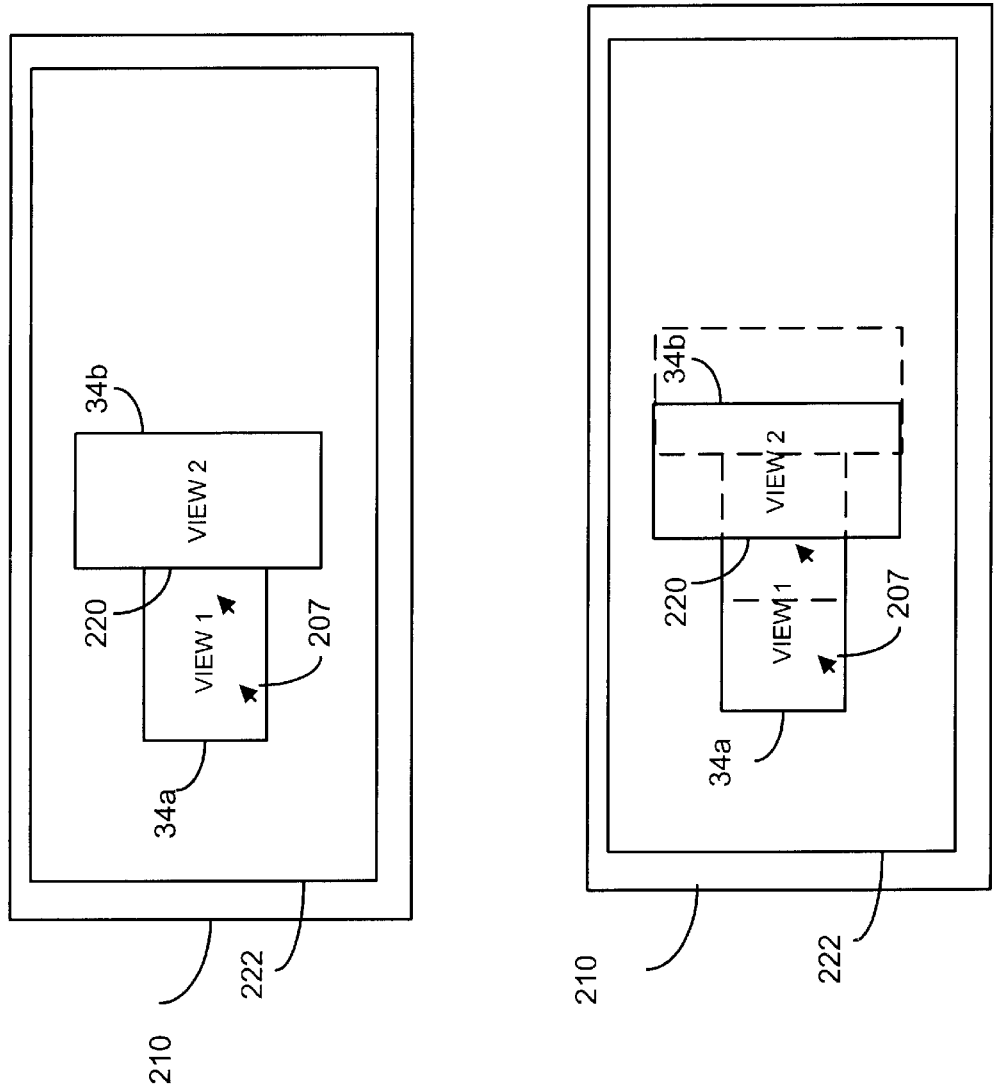

Referring to FIGS. 5a and 5b, an illustrative example of each embodiment will now be described. FIG. 5a graphically illustrates the embodiment having independent pan locking rectangles 202 and 204 each associated with a display device and each bounding a separate rectangular view 34*a* and 34*b* respectively. A larger common surface 210, defining the virtual desktop, bounds both independent panning rectangles 202 and 204, each of which are associated with a separate display device. In this embodiment, as a user moves the position indicator 207 across rectangular view 212 towards a second display and rectangular view 34*b*, the position indicator will travel to the second display screen. As the cursor is moved, as shown from left to right in the panning mode, the data is then portrayed in the view containing the cursor, to make the view appear as though it is moving across the desktop from left to right. The rectangular view 34*a* stays the same when the boundary meets the pan locking rectangle boundary of pan locking rectangle 202.

As shown in FIG. 5*b* a multiple view panning system with multi-connected views is shown. The rectangular views 34*a* and 34*b* are linked along a boundary 220. A single panning rectangle 222 bounds the two rectangular views and is bounded by the surface 210. As the cursor 207 is moved from left to right, both views have data changed to make it appear as though both are moving in unison across the surface. As previously mentioned, although unnecessary, neither of the views contains one-half of the data required to present or show one-half of the surface.

It should be understood that the implementation of other variations and modifications of the invention in its various aspects will be apparent to those of ordinary skill in the art, and that the invention is not limited by the specific embodiments described. For example, the term bounding includes sharing of the same boundary to what is being "bound". It is therefore contemplated to cover by the present invention, any and all modifications, variations, or equivalents that fall within the spirit and scope of the basic underlying principles disclosed and claimed herein.

What is claimed is:

1. A method of displaying information on at least a first and second display device comprising the steps of:

generating at least a first rectangular view for the first display device as a rectangle having a position and size for displaying data within at least one surface and defined by memory space containing data to be displayed in the first rectangular view;

generating at least a second rectangular view for the second display device as a rectangle having a position and size for displaying data within the at least one surface and defined by memory space containing data to be displayed in the second rectangular view;

providing at least a first pan locking rectangle associated with the first rectangular view and a second pan locking rectangle associated with the second rectangular view wherein the first and second pan locking rectangles are independent; and defining the at least one surface as a block of memory, accessed by a processing unit, containing display data wherein the at least one surface bounds the first and second rectangular views on the first and second displays, wherein movement of a position indicator across at least one boundary of the first pan locking rectangle causes the position indicator to control which data is contained in the second rectangular view on the second display to facilitate multiple view panning in a common surface over multiple displays.

2. The method of claim 1 including the step of defining the at least one surface to bound the first pan locking rectangle and the second pan locking rectangle.

3. The method of claim 1 wherein data portrayed in each of the first rectangular view and the second rectangular view is not equal to one half of the data required to portray one half of the entire at least one surface.

4. The method of claim 1 including the step of generating a definable view area for each of the first and second displays.

5. A method of displaying information on at least a first and second display device comprising the steps of:

generating at least a first rectangular view for the first display device as a rectangle having a position and size for displaying data within at least one surface and defined by memory space containing data to be displayed in the first rectangular view;

generating at least a second rectangular view for the second display device as a rectangle having a position and size for displaying data within the at least one surface and defined by memory space containing data to be displayed in the second rectangular view;

defining the at least one surface as a block of memory, accessed by a processing unit, containing display data wherein the at least one surface bounds the first and second rectangular views; and providing at least one pan locking rectangle to facilitate rectangular pan locking to bound the at least first and second rectangular views wherein data to be displayed on the first and second display devices is changed by the processing unit in response to receiving panning control data.

6. The method of claim 5 including the step of defining the at least one surface to bound the at least one pan locking rectangle and the at least one pan locking rectangle bounds the first and second rectangular views.

7. The method of claim 5 wherein data portrayed in each of the first rectangular view and the second rectangular view is not equal to one half of the data required to portray one half of the entire at least one surface.

8. The method of claim 5 including the step of generating a definable view area for each of the first and second displays.

9. The method of claim 6 comprising the steps of linking boundaries of the first and second rectangular view so that the rectangular views appear to move together when a position indicator reaches the linked boundary.

10. The method of claim 9 including the step of linking adjacent boundaries of the first and second rectangular views.

11. An apparatus for displaying information on at least a first and second display device comprising:

memory containing data to be displayed in at least a first and second rectangular view;

a processing unit that defines the at least one surface as a block of memory containing display data wherein the at least one surface bounds the first and second rectangular views on the first and second displays, the processing unit further including:

at least a first rectangular view generator for the first display device defining a first rectangular view as a rectangle having a position and size for displaying data within at least one surface;

at least a second rectangular view generator for the second display device defining a second rectangular view as a rectangle having a position and size for displaying data within the at least one surface; and at least a first pan locking rectangle provider associated with the first rectangular view and a second pan locking rectangle provider associated with the second rectangular view wherein the first and second pan locking rectangles are independent;

wherein movement of a position indicator across at least one boundary of the first pan locking rectangle causes the position indicator to control which data is contained in the second rectangular view on the second display to facilitate multiple view panning in a common surface over multiple displays.

12. The apparatus of claim 11 wherein the processing unit defines the at least one surface to bound the pan locking rectangle, and wherein the pan locking rectangle bounds the first and second rectangular views.

13. The apparatus of claim 11 wherein the processing unit provides data from the memory to be portrayed in each of the first rectangular view and the second rectangular view such that the data is not equal to one-half of the data required to portray one-half of the entire at least one surface.

14. The apparatus of claim 11 wherein the processing unit generates a definable view area for each of the first and second displays.

15. An apparatus for displaying information on at least a first and second display device comprising:

memory containing data to be displayed in at least a first and second rectangular view;

a processing unit that defines the at least one surface as a block of memory containing display data wherein the at least one surface bounds the first and second rectangular views on the first and second displays, the processing unit further including:

at least a first rectangular view generator for the first display device defining a first rectangular view as a rectangle having a position and size for displaying data within at least one surface;

at least a second rectangular view generator for the second display device defining a second rectangular view as a rectangle having a position and size for displaying data within the at least one surface; and a pan locking rectangle provider to facilitate rectangular pan locking to bound the at least first and second rectangular views wherein data to be displayed on the first and second display devices is changed by the processing unit in response to receiving panning control data.

16. The apparatus of claim 15 wherein the processing unit defines the at least one surface to bound the pan locking rectangle.

17. The apparatus of claim 15 wherein the processing unit provides data from the memory to be portrayed in each of the first rectangular view and the second rectangular view such that the data is not equal to one-half of the data required to portray one-half of the entire at least one surface.

18. The apparatus of claim 15 wherein the processing unit generates a definable view area for each of the first and second displays.

19. The apparatus of claim 16 wherein the processing unit links boundaries of the first and second rectangular view so that the rectangular views appear to move together when a position indicator reaches the linked boundary.

20. The apparatus of claim 19 wherein the processing unit links adjacent boundaries of the first and second rectangular views.

* * * * *